2,967,442
BORING BAR

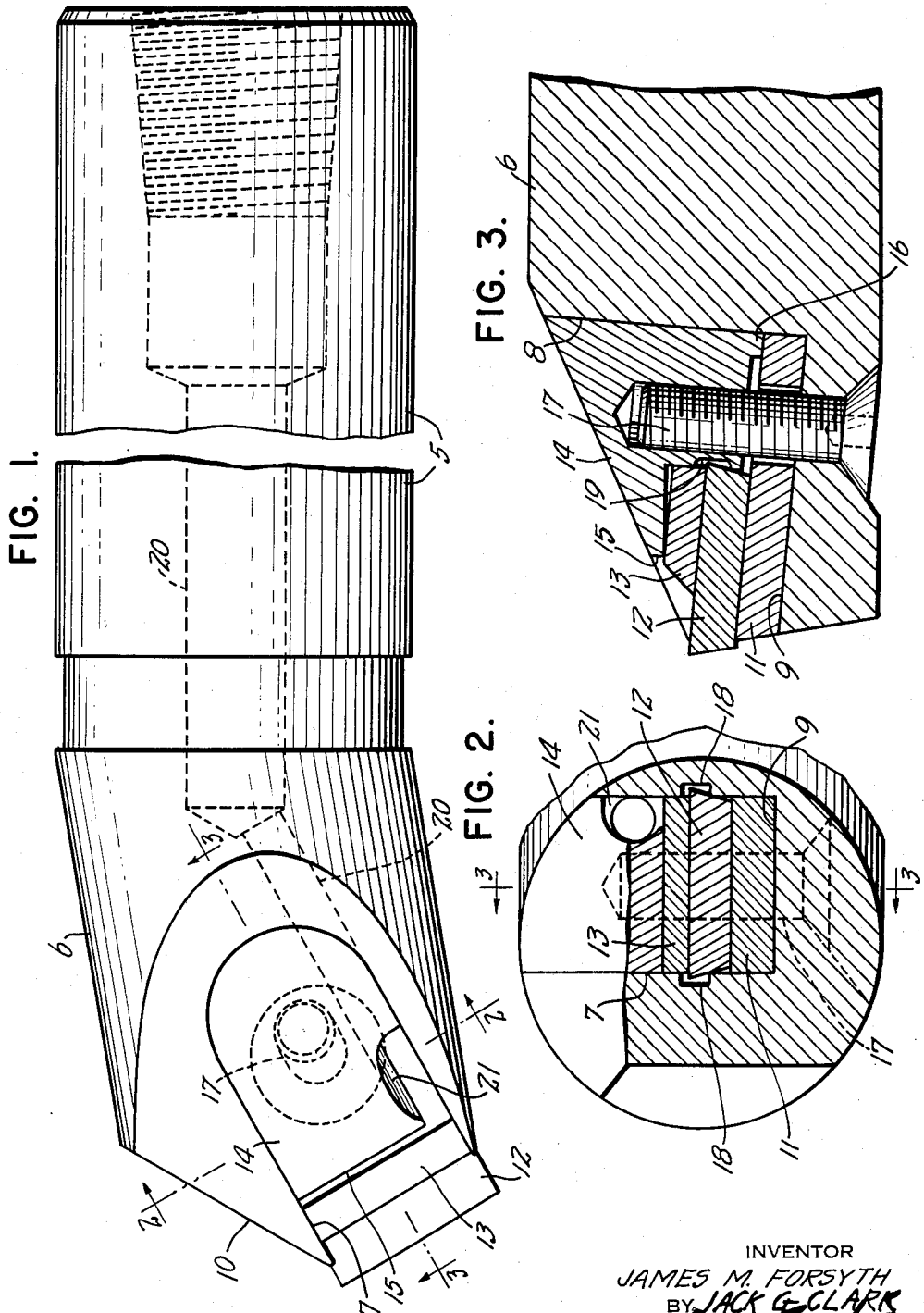

James M. Forsyth and Jack G. Clark, Houston, Tex., assignors to Forsyth Engineering Company, Houston, Tex., a corporation of Texas Continuation of application Ser. No. 662,195, May 28, 1957. This application Feb. 2, 1960, Ser. No. 6,321

1 Claim. (Cl. 77—58)

Our invention relates to a tool holder and will be described in relation to and as embodied in a boring bar. The principles of the invention are of broader application and the term "boring bar" is used in a broader sense to indicate any tool holder, such as a boring bar, or a lathe tool holder or the like. Furthermore, the term "carbide" tool is intended to cover a ceramic or other mechanically held insert tool.

This is a continuation of patent application Serial No. 662,195, filed May 28, 1957, now abandoned.

It is an object of the invention to provide a boring bar which is sturdy in construction and provides adequate support beneath the tool at the front end.

It is another object to provide an improved boring bar for carbide tools with improved means for holding the tool in place.

Still another object is to provide a boring bar wherein there are substantially no projections or recesses adjacent the cutting edge which might collect chips.

A further object is to provide an improved boring bar having improved means for transmitting cutting force on the carbide tool to the main body of the bar so as to provide great security and avoid chatter.

Another object is to provide a boring bar having improved means for very securely holding a carbide tool in place on the bar.

Another object is to provide a boring bar with improved means for conducting coolant to the zone adjacent the cutting edge.

Further an object is to provide a boring bar having improved chip breaker means which at the same time assists in holding a carbide tool in place.

Other objects and various features of novelty and invention will be hereinafter pointed out or will become apparent to those skilled in the art.

Briefly stated, in a preferred form of the invention, we provide a tool holder bar and the forward end is preferably bent at a lateral angle to the bar so that the tool projecting at the front may have sufficient projection without any danger of interference between the bar at the rear and the work piece. Better tool support is also thus obtained. The forward end of the boring bar has a transverse opening in the top thereof extending part way through the bar and forming a bottom seat and a rear seat. The opening extends all the way to the front and preferably has parallel sides. Within the opening is a clamp nut for holding the carbide tool in place in the opening and this clamp nut at the top is preferably substantially flush with the rest of the bar adjacent the edges of the opening and this nut preferably engages the rear seat at the rear of the transverse opening. The side walls of the opening are preferably parallel so as to fit the parallel sides of the clamping nut. The carbide tool is placed in the opening and the nut holds the same in place and there may also be a chip breaker to assist in holding the carbide tool in place and there may also be an anvil member resting on the bottom of the transverse opening. Preferably, there are no projections at the top or any openings to catch chips. The clamp screw preferably extends up through the bar and into the clamp nut for drawing the same downwardly for holding the carbide tool in place.

In the drawings, which show for illustrative purposes only, a preferred form of the invention:

Fig. 1 is a top plan view of a boring bar illustrating features of the invention;

Fig. 2 is a sectional view, taken substantially in the plane of the line 2—2 of Fig. 1;

Fig. 3 is a sectional view, taken substantially in the plane of the line 3—3 of Fig. 2.

In said drawings, the tool holder herein referred to and called a boring bar 5 has an extended shank for securement to a suitable slide, turret or the like. The forward end of the bar retaining the same diameter is bent at an angle, as indicated at 6, and it is on this angularly bent bar that the tool is carried so that the tool may project sidewise, as it does as shown particularly in Fig. 1. There is then no danger of any collision between the main shank and the work piece as the boring bar is fed in.

The forward end of the bar is preferably provided with a transverse opening 7 extending upward through the bar and providing a rear seat surface 8 and a bottom seat surface 9. The opening is open at the top and open at the front and the top of the bar is slabbed off, as indicated particularly in Fig. 3, and preferably at the side, as indicated at 10. In the preferred form there is an anvil member 11 which may be of carbide and rests on the bottom seat 9 and a carbide tool or bit 12 rests in this case on the anvil 11. In the preferred form there is a chip breaker 13 resting on the tool and a clamp nut 14 has a forward end 15 which rests about centrally of the tool 12, but in this case on the chip breaker 13, which in turn rests on the tool 12 and forces the latter down on to its seat. The clamp nut extends downwardly into the opening 7 and there is a heel 16 at the bottom resting on the bottom surface either of the opening or on the anvil 11. The remainder of the nut 14 is preferably free of the anvil, as shown especially in Fig. 3, and preferably has clearance with the chip breaker 13, as shown, so that only the tip 15 engages the chip breaker. The clamp screw 17 extends up through the bottom of the bar 6 and into the clamp nut 14 for drawing the latter downwardly. This downward drawing by the clamp screw 17 tends to cause the clamp nut to pivot about the heel 16 so as to cause the forward end 15 to press with great force on the chip breaker and the tool. It will be seen then that by having clearance between the clamp nut 14 and the chip breaker as well as between it and the anvil member 11, there is no danger of having the nut bottom without holding the tool 12 securely in place.

In the form illustrated the carbide tool 12 is square and is of the variety that is turned until all of its edges have been used up and is then discarded. In order to protect the cutting edges of the tool 12, the sides of the slot 7 may be relieved, as indicated at 18—18 so that the cutting edges of the tool will not engage the sides of the opening when the tool is put in place or held therein. The tool at the rear also engages the rear or intermediate portion of the clamp nut 14 and it will be seen that the clamp nut at such intermediate surface is relieved, as indicated at 19 for protecting the rear edge of the tool 12.

Any rearward cutting force on the tool 12 will be transmitted directly to the intermediate surface of the clamp nut 14 at the relieved portion and through the nut 14 itself, such force will be transmitted directly to the sturdy boring bar itself. The downward cutting force on the tool will be transmitted through the anvil, when one is provided, directly to the bottom seat portion of the sturdy boring bar which, due to the angular turn of the forward end, provides considerable metal under the bottom of the tool for sustaining any cutting load.

The boring bar is preferably drilled, as indicated at 20, for transmitting coolant through the bar and to the forward end thereof. At the forward end the opening 20 opens into the transverse opening 7 in the bar and connects with the coolant passage 21 in the clamp nut 14. Thus, coolant supplied to the boring bar will be flushed out to the cutting zone so as to keep the tool cool and wash away chips. The coolant thus flowed out into the cutting zone will not be carried away by the rotating work.

We have described the boring bar in a complete preferred form wherein there is a separate anvil member 11 seated on the bottom surface 9 in the transverse opening 7 in the bar and we have also described a special chip breaker 13 which rests on the top of the carbide tool 12 and is itself engaged by the forward end 15 of the clamp nut 14. It will be understood, however, that it is not at all times necessary to have a chip breaker, in which case the chip breaker would be omitted and the clamp nut would fit directly on the tool 12. Furthermore, if the seat 9 in the bottom of the transverse opening is a good seat, it may not always be necessary to have the separate anvil member 11 and in that case the anvil may be omitted, or in other words the opening 7 need not be made quite so deep, and what is now the seat surface of the anvil may be the bottom surface of the opening. Therefore, in some of the claims we have referred to the carbide tool as being supported by the bottom of the opening and have also referred to the forward end of the clamp nut as engaging the middle of the tool 12 to hold it in place. These claims are simply designed to cover those cases where a chip breaker is not needed and where an anvil 11 would not be needed. Even without the chip breaker and without the anvil many of the improved features of the invention would still be present.

There are no top projections to catch chips and there are no recesses for catching or receiving chips. It will be seen that the tool will be well protected when in place on the holder and therefore all of its edges may be used and then the tool is discarded. It will also be seen that the tool is adequately backed up rearwardly by the clamp nut and through it by the boring bar itself. The tool is backed up at the bottom by an anvil when one is employed and by the heavy metal of the bar beneath the tool. Due to the clearances and the tilting action of the nut 14 there is practically no tendency for the nut to ever seat and the tool will always be securely held in place.

While the invention has been described in considerable detail, and a preferred form illustrated, it is to be understood that various modifications and changes may be made within the scope of the invention, as defined in the appended claim.

We claim:

In a boring bar, a bar having the top front part slabbed off, said bar at the front end having a notch extending from the front rearwardly and opening at the top in said slabbed off portion, an anvil extending from the front of said notch to abutting relation therewith at the rear, said anvil lying flat on the bottom of the notch, a carbide tool resting on top of said anvil and confined at the sides by the lateral sides of said notch, a chip breaker resting on said tool, a clamp nut fitted entirely within said notch, said clamp nut having its forward edge only resting on said chip breaker and having its rear edge in said notch and resting on top of said anvil so as to pivot thereon when drawn down and cause the front end of said nut to tightly clasp said chip breaker and tool and anvil in said notch, the top of said clamp nut being slabbed off at the top so as to form a continuation of the slabbed off end of said bar, a substantially vertical surface on said clamp nut beneath and recessed from its forward end and having a transverse groove therein intermediate its extremities to receive the upper rearward edge of said carbide tool, the lower portion of said vertical surface below said transverse groove forming an abutment surface for said carbide tool, and a screw extending up through said bar and into said clamp nut to draw the latter downwardly in clamping direction.

No references cited.